(12) United States Patent
Stevens et al.

(10) Patent No.: US 7,925,836 B2
(45) Date of Patent: Apr. 12, 2011

(54) SELECTIVE COHERENCY CONTROL

(75) Inventors: Ashley Miles Stevens, Cambridge (GB);
Edvard Sorgard, Trondheim (NO)

(73) Assignee: ARM Limited, Cambridge (GB)

( * ) Notice: Subject to any disclaimer, the term of this patent is extended or adjusted under 35 U.S.C. 154(b) by 559 days.

(21) Appl. No.: 12/010,511

(22) Filed: Jan. 25, 2008

(65) Prior Publication Data
US 2009/0193197 A1 Jul. 30, 2009

(51) Int. Cl.
*G06F 13/00* (2006.01)
*G06F 13/28* (2006.01)
*G06F 15/16* (2006.01)

(52) U.S. Cl. ............... 711/141; 711/138; 711/E12.021; 711/E12.026; 345/503

(58) Field of Classification Search ........................ None
See application file for complete search history.

(56) References Cited

U.S. PATENT DOCUMENTS
2007/0226424 A1* 9/2007 Clark et al. ................... 711/141
* cited by examiner

*Primary Examiner* — Reginald G Bragdon
*Assistant Examiner* — Eric S Cardwell
(74) *Attorney, Agent, or Firm* — Nixon & Vanderhye P.C.

(57) ABSTRACT

A data processing system is provided with a general purpose programmable processor and an accelerator processor. Coherency control circuitry manages data coherence between data items which may be stored within a cache memory and/or a further memory. Memory access requests from the accelerator processor are received by a memory request switching circuitry which is responsive to a signal from the accelerator processor to direct the memory access request either via coherency control circuit or directly to the further memory.

20 Claims, 4 Drawing Sheets

SELECTIVE COHERENCY CONTROL

TECHNICAL FIELD

This technology described in this application relates to the field of data processing systems, and more particularly, to data processing systems having a general purpose programmable processor, an accelerator processor and mechanisms for coherency control within a memory hierarchy associated with the system.

BACKGROUND

It is known to provide data processing systems including a general purpose programmable processor (e.g. a multi-core processor) and an accelerator processor (e.g. a graphics processing unit). Such systems can provide a good degree of efficiency as the general purpose programmable processor is flexible in the processing tasks it is able to perform while the accelerator processor can be targeted at a subset of processing operations, such as computationally intensive graphics processing operations, so as to perform these high volume operations with an improved degree of efficiency thereby justifying the provision of the accelerator processor. Within such systems it is often desirable that the general purpose programmable processor and the accelerator processor share some data. As an example, the general purpose programmable processor may generate data which at a high level defines the processing operations which are to be performed by the accelerator processor (e.g. start point data and/or control data) and the accelerator processor then reads this data in order to determine the processing operations it is to perform.

It is also known within data processing systems to provide hierarchical memory systems including a cache memory and at least some further memory. The cache memory provides rapid access to time-critical or frequently accessed data while the further memory provides typically slower but larger capacity memory storage able to meet the overall storage requirements of the system. Within the context of such systems a problem arises in maintaining the coherence of data which may be stored at various places within the memory hierarchy. This is particularly the case when more than one processor, such as a general purpose programmable processor and an accelerator processor, are able to access the same data. If a cache memory is storing a local copy of a data item and there is another copy of that data item in the further memory, then coherency control mechanisms are provided to ensure that the up-to-date version of a data item is used at all times and that changes made to one copy of the data item are in due course also made to the other copies of the data item. Such coherency control mechanisms are complex and represent a significant resource overhead. Furthermore, the capabilities of such coherency control mechanisms to deal with large volumes of data accesses may be limited and this can constrain overall system performance. As an example, an accelerator processor may access large volumes of data at high speed and a coherency control mechanism able to deal with such large volumes of data that can be shared with a general purpose programmable processor will have a disadvantageously high level of complexity and require a disadvantageous amount of circuit overhead.

SUMMARY

Viewed from one aspect the technology described in this application provides apparatus for processing data comprising:
  a general purpose programmable processor;
  a cache memory coupled to said general purpose programmable processor;
  a further memory coupled to said cache memory;
  an accelerator processor coupled to said further memory;
  coherency control circuitry coupled to said cache memory, said further memory and said accelerator processor and responsive to a memory access request to target data at a target address received from said accelerator processor to send said memory access request to one of:
    said cache memory if said cache memory is caching said target data; and
    said further memory if said cache memory is not caching said target data; and
  memory request switching circuitry coupled to said accelerator processor, said further memory and said coherency control circuitry and responsive to a signal from said accelerator processor to send said memory access request to one of:
    said coherency control circuitry; and
    said further memory independently of said coherency control circuitry.

The inventors recognized that in many circumstances it is possible to identify using signals from the accelerator processor, those data items where coherency control between a general purpose programmable processor and an accelerator processor is required and those data items where such coherency control is not required. In this way, data items which are shared by the general purpose programmable processor and the accelerator processor may be subject to coherency control to ensure correct operation while data items which are only used and manipulated by the accelerator processor may be safely accessed without using the coherency control circuitry thereby reducing the load on the coherency control circuitry. The memory request switching circuitry can use a signal from the accelerator processor (which may, for example, be a target address or a source identifying tag) to identify whether or not coherency control is required and appropriately route the memory access request.

It will be appreciated that the general purpose programmable processor could have a variety of different forms. The general purpose programmable processor could be a single core processor. Coherency control is a particular concern within systems in which the general purpose programmable processor comprises a plurality of processor cores, each processor core having a local cache memory. Whilst multi-core processors have advantages in processing performance, particularly when they are provided with local cache memories, they do present the difficulty of an increased requirement for coherency control.

Within the context of multi-core general purpose programmable processors, the coherency control circuitry may serve (e.g. programmably) to maintain coherency with the local cache memories as well as with the lower order cache memory and the further memory.

It will be appreciated that hierarchical memory systems may contain multiple levels and that the further memory referred to above may itself comprise one or more of a lower order cache memory and a main memory. Other forms of further memory are also possible.

The memory request switching circuitry can be arranged to respond to the target address in a variety of different ways. In some embodiments a control bit within the target address may be used to control the sending of a memory access request to one of the coherency control circuitry and the further memory. As an example, the highest order bit within the memory address generated by the accelerator processor (e.g. after a virtual-to-physical address translation by an MMU) may be used to control the memory request switching circuitry and indicate whether or not coherence control is required in respect of that memory access request.

The accelerator processor may include a memory management unit, which may already be provided to give other memory control operations in respect of the accelerator processor, and this memory management unit can be programmed with memory page table data which indicates whether or not coherence control is required in respect of different target addresses and thereby control the memory request switching circuitry.

The accelerator processor may also comprise a plurality of real or virtual memory transaction masters with associated source tags. These tags may be used by an MMU as an input to its programmable address translation, by a separate programmable or hardwired switching control circuit or by the memory request switching circuitry itself to control the routing of the memory access requests.

The memory request switching circuitry can be located at a variety of different positions within the system. One example position is as part of the accelerator processor itself. Another example position is within interconnect circuitry connecting the accelerator processor to other parts of the system.

As will be appreciated the accelerator processor could take a wide variety of different forms. One particular form in which the present techniques are useful is when the accelerator processor is a graphics processing unit. Such graphics processing unit typically handle high volumes of data and it may be relatively readily determined which portions of this data are shared with the general purpose programmable processor and which portions are not-shared and accordingly do not require coherency control.

In the context of a graphics processing unit the general purpose programmable processor can generate vertex data and control data associated with graphical images to be rendered and the graphics processing unit may include a vertex transforming portion which reads the vertex data and control data generated by the general purpose programmable processor via the coherency control circuitry and writes transformed vertex data to the further memory independently of the coherency control circuitry as such transformed vertex data will not be shared with the general purpose programmable processor.

A texture rendering portion of the graphics processing unit may then read the transformed vertex data from and write texture-rendered data to the further memory independently of the coherency control circuitry as the general purpose programmable processor will not access that transformed vertex data or the texture-rendered data.

Viewed from another aspect the technology described in this application provides a method of controlling a memory access request to target data at a target address within an apparatus for processing data having a general purpose programmable processor; a cache memory coupled to said general purpose programmable processor; a further memory coupled to said cache memory; an accelerator processor coupled to said further memory; and coherency control circuitry coupled to said cache memory, said further memory and said accelerator processor; said method comprising the steps of:

in response to said target address of a memory access request received from said accelerator processor, using memory request switching circuitry coupled to said accelerator, said further memory and said coherency control circuitry, sending said memory access request to one of:
   said coherency control circuitry; and
   said further memory independently of said coherency control circuitry; and
in response to a signal from said accelerator processor, sending said memory access request to one of:
   said cache memory if said cache memory is caching said target data; and
   said further memory if said cache memory is not caching said target data.

Viewed from a further aspect the technology described in this application provides apparatus for processing data comprising:
   general purpose programmable processor means;
   cache memory means coupled to said general purpose programmable processor means;
   further memory means coupled to said cache memory means;
   accelerator processor means coupled to said further memory means;
   coherency control means coupled to said cache memory means, said further memory means and said accelerator processor means for sending, in response to a memory access request to target data at a target address received from said accelerator processor means, said memory access request to one of:
      said cache memory means if said cache memory means is caching said target data; and
      said further memory means if said cache memory means is not caching said target data; and
   memory request switching means coupled to said accelerator processor means, said further memory means and said coherency control means for sending, in response to a signal from said accelerator processor, said memory access request to one of:
      said coherency control means; and
      said further memory means independently of said coherency control means.

The above, and other objects, features and advantages will be apparent from the following detailed description of illustrative embodiments which is to be read in connection with the accompanying drawings.

DESCRIPTION

Figure 1:
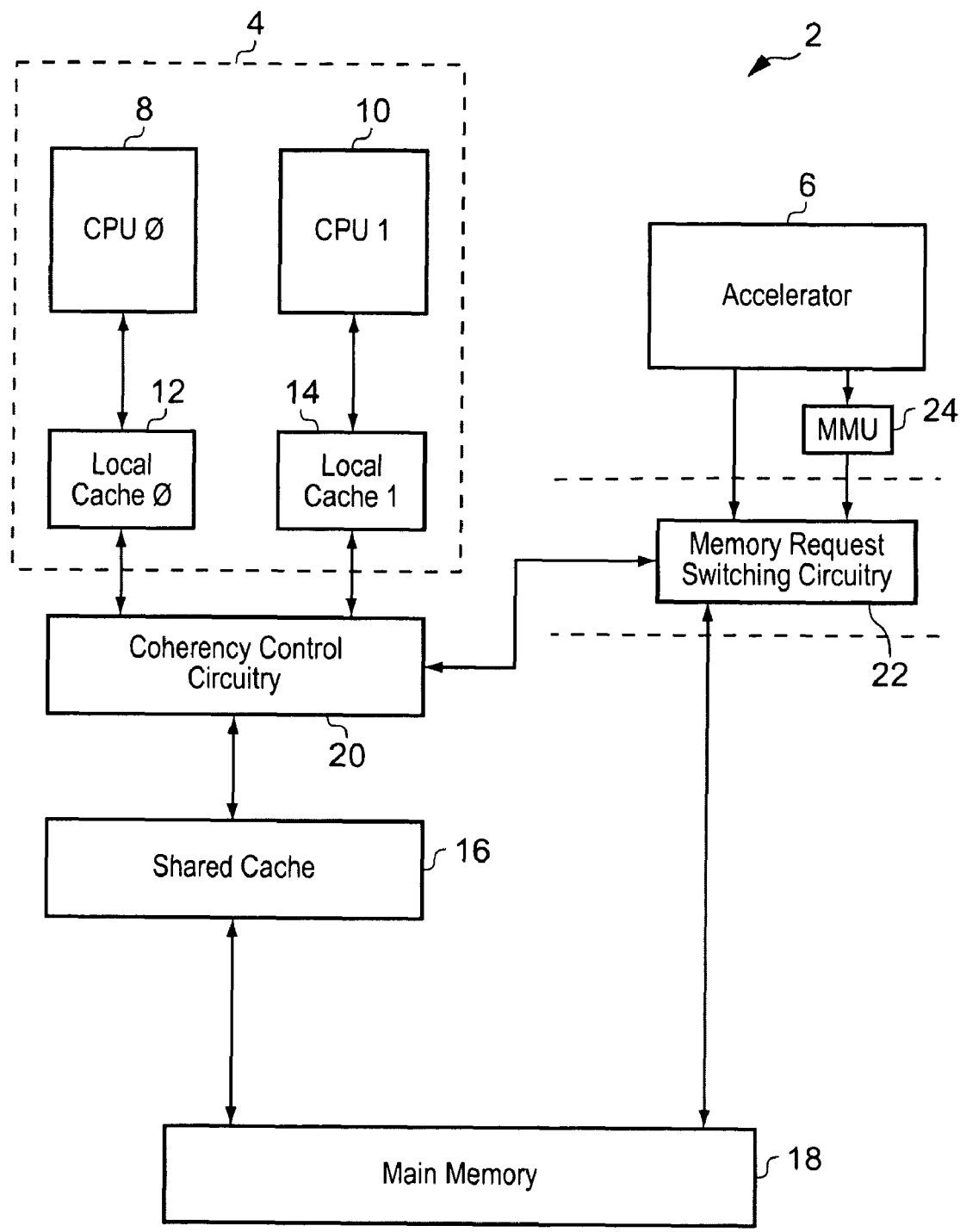
FIG. 1 schematically illustrates a data processing system including a general purpose programmable processor and an accelerator processor which share at least a portion of a memory hierarchy.

FIG. 1 schematically illustrates a data processing apparatus 2 including a general purpose programmable processor 4 and an accelerator processor 6. The general purpose programmable processor 4 is a multi-core processor including a first processor core 8, a second processor core 10 and respective local cache memories 12, 14. The data processing apparatus 2 also includes a shared cache memory 16 and a further memory 18 in the form of a main memory. It will be appreciated that the further memory 18 may itself be hierarchical and contain one or more further cache memories.

Coherency control circuitry 20 is provided to manage coherency between the data stored at different locations with the system. The coherency control circuit 20 is coupled to the local cache memories 12, 14, the shared cache memory 16, the further memory 18 and via memory request switching circuitry 22 to the accelerator processor 6. The coherency control circuitry 20 serves to maintain coherence between data items from the same memory address which are stored at different locations within the memory hierarchy, e.g. within local cache 12, within local cache 14, within shared cache 16, within a main memory 18 and within the accelerator processor 6. The coherency control circuitry 20 may be programmably controlled to control coherency with respect to data that may be accessed by the accelerator processor 6 in respect of the shared cache memory 16 and the further memory 18, but not the local cache memories 12, 14 (e.g. data shared with the accelerator 6 may be marked as non-cacheable within the local cache memories 12, 14). Alternatively, the coherency control circuitry 20 may manage coherency for data shared with the accelerator processor 6 and stored within the local cache memories 12, 14. The mechanisms by which such coherency is managed can vary and will be familiar to those in this technical field. Examples include the snooping of memory access requests and the keeping of data identifying the memory addresses of data items stored within the various possible memory locations. The coherency control circuitry 20 can be responsible for updating various copies of a data item which are present if one of those data items is changed or may deal with the issue by mechanisms including flushing data items from various levels of cache storage, denying memory accesses to data items, lockdown for exclusive access areas etc.

The coherency control circuitry 20 requires a significant circuit overhead in order to achieve these functions at sufficient speed. One constraining factor is how many pending memory access requests may be buffered within the coherency control circuit 20 and this can provide a bottleneck when the accelerator processor 6 is required to access high volumes of data.

The coherency control circuitry may direct a memory access request to one or more of the local cache 12, the local cache 14, the shared cache 16 and the further memory 18 depending upon the state of the system at that time (and the programming/configuration of the system). The memory request switching circuitry 22 is coupled to the accelerator processor 6 and receives a memory access request to a target address, from the accelerator processor 6. In one example embodiment, in dependence upon this target address the memory request switching circuitry 22 either routes the memory request to the coherency control circuitry 20 or routes the memory request directly to the further memory 18 independently of the coherency control circuitry 20. In some embodiments the memory request switching circuitry 22 is arranged to be responsive to a switching control bit (e.g. a highest order bit although other bits are possible) within the target address to direct the memory access request to either the coherency control circuit 20 or the further memory 18. As an alternative the accelerator processor 6 can generate a source tag identifying the real or virtual source with the accelerator processor 6 of the memory access request and this source tag can be used directly or indirectly (e.g. by an accelerator MMU) by the memory request switching circuitry 22 to control routing of the memory request. In the example illustrated in FIG. 1, the accelerator processor 6 has an associated memory management unit 24 which includes memory page table data that is programmed to define memory management parameters associated with the accelerator processor 6. This memory page table data can include information specifying whether memory accesses to particular regions of memory address space should be directed to the coherency control circuitry 20 or directly to the further memory 18. The use of the memory management unit 24 in combination with the memory request switching circuitry 22 provides a highly flexible mechanism for controlling whether or not coherency control operations are performed upon particular memory regions.

As one example the memory management unit 24 can be programmed to generate physical addresses in one half of the memory address space of data shared with the general purpose programmable processor 4 and in the other half for non-shared data. The highest order bit of the translated physical address could then be used to control the switching of the memory request switching circuitry 22.

Figure 2:
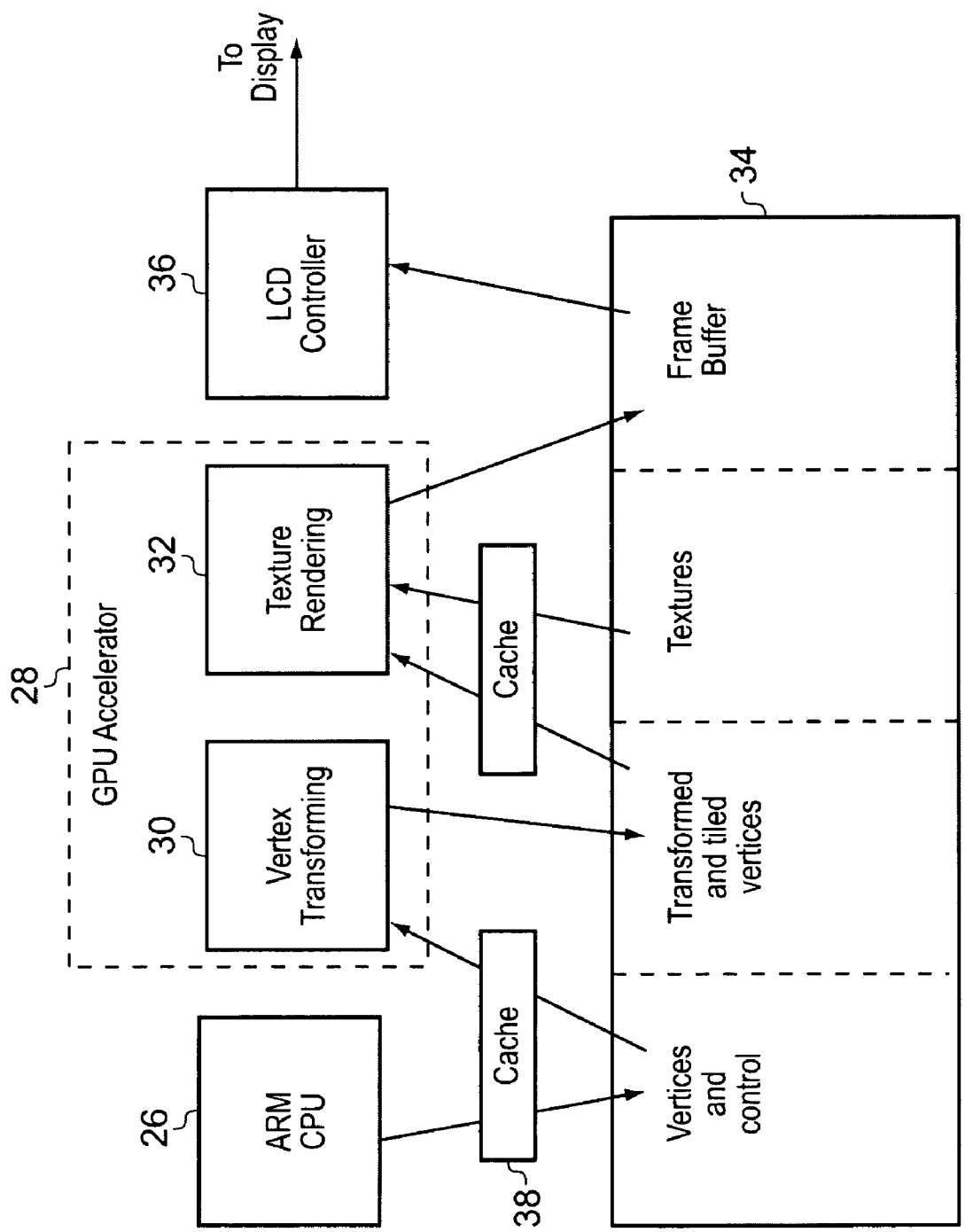
FIG. 2 schematically illustrates how a general purpose programmable processor and an accelerator processor may access and share different types of data.

FIG. 2 illustrates an example data flow in the context of a data processing system comprising a general purpose programmable processor 26, in the form of an ARM processor core, and an accelerator processor 28, in the form of a graphics processing unit. The accelerator processor 28 includes a vertex transforming portion 30 and a texture rendering portion 32. These can be separate memory request sources each having a different source tag as discussed above. The vertex transforming portion 30 reads vertex data and control data that has been written to a memory system 34 by the general purpose programmable processor 26 so as to generate, as directed by the control data, transformed vertex data which it writes back to the memory system 34. The texture rendering portion 32 reads the transformed vertex data and texture data from the memory system 34 and generates output pixel data which is stored into a frame buffer within the memory system 34 prior to being driven out by an LCD controller 36 to drive a display device.

It will be seen in FIG. 2 that the vertex data and control data is shared by the general purpose programmable processor 26 and the vertex transforming portion 30 of the accelerator processor 28. This vertex data is also routed via a cache memory 38. Coherency control with respect to this vertex data and control data is important and accordingly memory accesses to such vertex data and control data will be directed by the memory request switching circuitry 22 when originating in the accelerator processor 28 to pass via the coherency control circuitry 20. Conversely, the transformed vertex data generated by the vertex transforming portion 30 as directed by the control data will only be written and read by the accelerator processor 28 and accordingly coherency control can be managed locally within the accelerator processor 28, or may not arise in any event due to appropriate sequencing of the processing operations. In this circumstance, the access to the transformed vertex data and the texture-rendered data generated by the texture rendering portion 32 can take place directly with the memory system 34 and need not route via coherency control circuitry 20.

It will be appreciated that the data flow within a data processing apparatus as illustrated in FIG. 2 will in many cases be available and well understood in advance thereby allowing the target addresses at which data items are stored to be selected and controlled such that the memory request switching circuitry can direct only those memory access requests requiring coherency control to the coherency control circuit 20 in dependence upon the target address or other signal generated by the accelerator processor 28. This saves resource in the coherency control circuit 20 and speeds the overall system operation.

Figure 3:
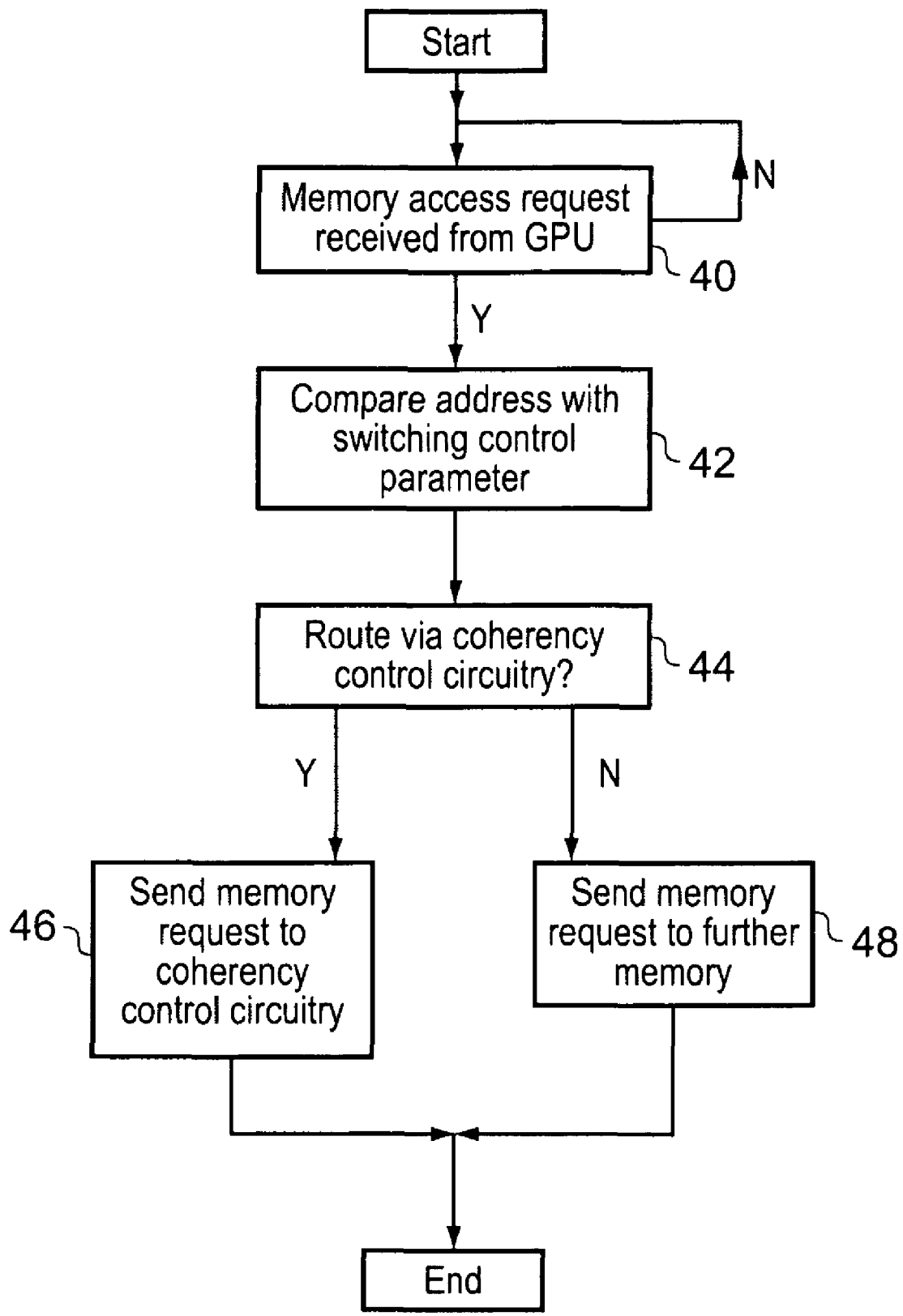
FIG. 3 is a flow diagram schematically illustrating control of memory request switching circuitry.

FIG. 3 is a flow diagram schematically illustrating the operation of one example of the memory request switching circuitry 22. At step 40 the memory request switching circuitry 22 waits for a memory access request to be received from the accelerator processor 28. When such a request is received, step 42 compares the target address of that memory access request with a switching control parameter. The switching control parameter may be the value of a predetermined bit within the target address (e.g. the most significant bit may be used to indicate whether or not coherency control is required), may be provided from a programmable memory management unit 24 associated with the accelerator processor 28, or may be provided by a source identifying tag. Step 44 then determines whether or not the control parameter indicates that the memory access request should be routed via the coherency control circuitry 20. If coherency control is required in respect of that memory access request, then step 46 sends the memory request to the coherency control circuitry 20. If coherency control is not required in respect of that memory access request, then step 48 sends the memory access request directly to the further memory 18 independently of the coherency control circuitry 20.

Figure 4:
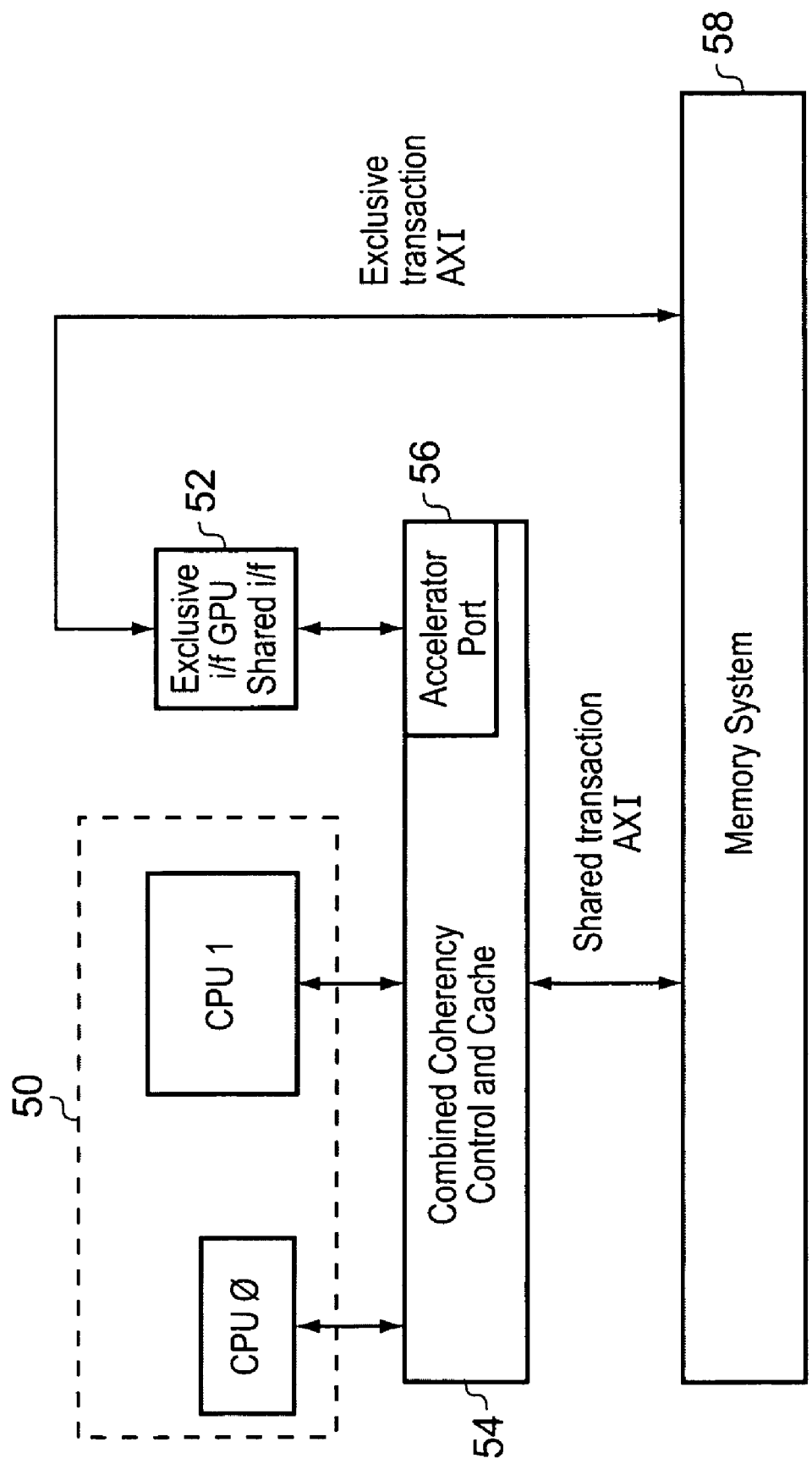
FIG. 4 schematically illustrates a system having a general purpose programmable processor and an accelerator processor as well as a shared transaction interconnect and an exclusive transaction interconnect.

FIG. 4 schematically illustrates a further embodiment. In this embodiment the general purpose programmable processor 50 has multiple heterogeneous processor cores. An accelerator processor 52 in the form of a graphics processing unit works in cooperation with the general purpose programmable processor 50. A combined coherency control and cache unit 54 is coupled to the general purpose programmable processor 50 and to a shared interface of the accelerator processor 52. The combined coherency control and cache unit 54 includes an accelerator port 56 provided to allow accelerator processors to connect to the combined coherency control and cache unit 54 and benefit from the coherency control it provides.

The accelerator processor 52 also has an exclusive interface via which it can send memory access requests directly to a main memory 58. The accelerator processor 52 will include memory request switching circuitry to direct memory access requests either to the exclusive interface or the shared interface of the accelerator processor 52.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the appended claims.

We claim:

1. Apparatus for processing data comprising:
   a general purpose programmable processor;
   a cache memory coupled to said general purpose programmable processor;
   a further memory coupled to said cache memory;
   an accelerator processor coupled to said further memory;
   coherency control circuitry coupled to said cache memory, said further memory and said accelerator processor and configured to send, in response to a memory access request to target data at a target address received from said accelerator processor, said memory access request to one of:
   said cache memory if said cache memory is caching said target data; and
   said further memory if said cache memory is not caching said target data; and
   memory request switching circuitry coupled to said accelerator processor, said further memory and said coherency control circuitry and responsive to a signal from said accelerator processor to send said memory access request to one of:
   said coherency control circuitry; and
   said further memory independently of said coherency control circuitry,
   wherein the further memory is accessible to the accelerator processor via:
   (a) a first path via said coherency control circuitry; and
   (b) a second path bypassing said coherency control circuitry.

2. Apparatus as claimed in claim 1, wherein said signal from said accelerator processor comprises one of:
   said target address; and
   a source tag identifying a source of said memory request for said accelerator processor.

3. Apparatus as claimed in claim 1, wherein said general purpose programmable processor comprises a plurality of processor cores, each processor core having a local cache memory.

4. Apparatus as claimed in claim 3, wherein said coherency control circuitry is responsive to said memory access request to send said memory access request to one or more of said local cache memories caching said target data so as to maintain coherency.

5. Apparatus as claimed in claim 1, wherein said further memory comprises one or more of a lower order cache memory and a main memory.

6. Apparatus as claimed in claim 1, wherein at least part of said further memory is shared by said general purpose programmable processor and said accelerator processor.

7. Apparatus as claimed in claim 1, wherein said memory request switching circuitry is responsive to a switching control bit within said target address to send memory access request to one of said coherency control circuitry and said further memory.

8. Apparatus as claimed in claim 7, wherein said accelerator processor is programmable to generate memory access requests having said switching control bit set to:
   a first value so as to send said memory access request to said coherency control circuitry when said target data is shared within said general purpose programmable processor; and
   a second value so as to send said memory access request to said further memory when said target data is not shared within said general purpose programmable processor.

9. Apparatus as claimed in claim 1, wherein said memory request switching circuitry is part of interconnect circuitry connecting said accelerator processor to other parts of said apparatus.

10. Apparatus as claimed in claim 1, wherein said memory request switching circuitry is part of said accelerator processor.

11. Apparatus as claimed in claim 1, wherein said accelerator processor includes a memory management unit responsive to programmable memory page table data to manage memory operations performed by said accelerator processor and said memory request switching circuitry is responsive to a signal from memory management unit generated in dependence upon said signal from said accelerator processor and said memory page table data to control said sending of said memory access request by said memory request switching circuitry.

12. Apparatus as claimed in claim 1, wherein said memory request switching circuitry is part of interconnect circuitry connecting said accelerator processor to other parts of said apparatus and is responsive to said target address being within a range of target addresses associated with either said coherency control circuitry or said further memory to control said sending of said memory access request by said memory request switching circuitry.

13. Apparatus as claimed in claim 1, wherein said accelerator processor is a graphics processing unit.

14. Apparatus as claimed in claim 13, wherein said general purpose programmable processor generates vertex data associated with graphical images to be rendered by said graphics processing unit, said vertex data being stored within said cache memory and said further memory.

15. Apparatus as claimed in claim 13, wherein said general purpose programmable processor generates control data for controlling said graphics processing unit, said control data being stored within said cache memory and said further memory.

16. Apparatus as claimed in claim 14, wherein a vertex transforming portion of said graphics processing unit reads said vertex data via said coherency control circuitry and writes transformed vertex data to said further memory independently of said coherency control circuitry.

17. Apparatus as claimed in claim 16, wherein a texture rendering portion of said graphics processing unit reads said transformed vertex data from and writes texture-rendered data to said further memory independently of said coherency control circuitry.

18. Apparatus as claimed in claim 1, wherein said coherency control circuitry manages coherence between said cache memory and said further memory and does not manage coherence of any data stored within said accelerator processor.

19. A method of controlling a memory access request to target data at a target address within an apparatus for processing data having a general purpose programmable processor; a cache memory coupled to said general purpose programmable processor; a further memory coupled to said cache memory; an accelerator processor coupled to said further memory; and coherency control circuitry coupled to said cache memory, said further memory and said accelerator processor; said method comprising the steps of:

in response to a signal from said accelerator processor and using memory request switching circuitry coupled to said accelerator, said further memory and said coherency control circuitry, sending said memory access request to one of:

said coherency control circuitry; and
said further memory independently of said coherency control circuitry; and in response to said memory access request received by said coherency control circuitry from said accelerator processor, sending said memory access request to one of:

said cache memory if said cache memory is caching said target data; and
said further memory if said cache memory is not caching said target data, wherein the further memory is accessible to the accelerator processor via:
(a) a first path via said coherency control circuitry; and
(b) a second path bypassing said coherency control circuitry.

20. Apparatus for processing data comprising:

general purpose programmable processor means for processing data;

cache memory means, coupled to said general purpose programmable processor means, for storing data;

further memory means, coupled to said cache memory means, for storing data;

accelerator processor means, coupled to said further memory means, for processing data;

coherency control means coupled to said cache memory means, said further memory means and said accelerator processor means for sending, in response to a memory access request to target data at a target address received from said accelerator processor means, said memory access request to one of:

said cache memory means if said cache memory means is caching said target data; and
said further memory means if said cache memory means is not caching said target data; and memory request switching means, coupled to said accelerator processor means, said further memory means and said coherency control means, for sending, in response to a signal from said accelerator processor, said memory access request to one of:

said coherency control means; and
said further memory means independently of said coherency control means, wherein the further memory means is accessible to the accelerator processor means via:
(a) a first path via said coherency control means; and
(b) a second path bypassing said coherency control means.

* * * * *